S. Waterman,
Circular Saw Mill.
Nº 10,778. Patented Apr. 18, 1854.
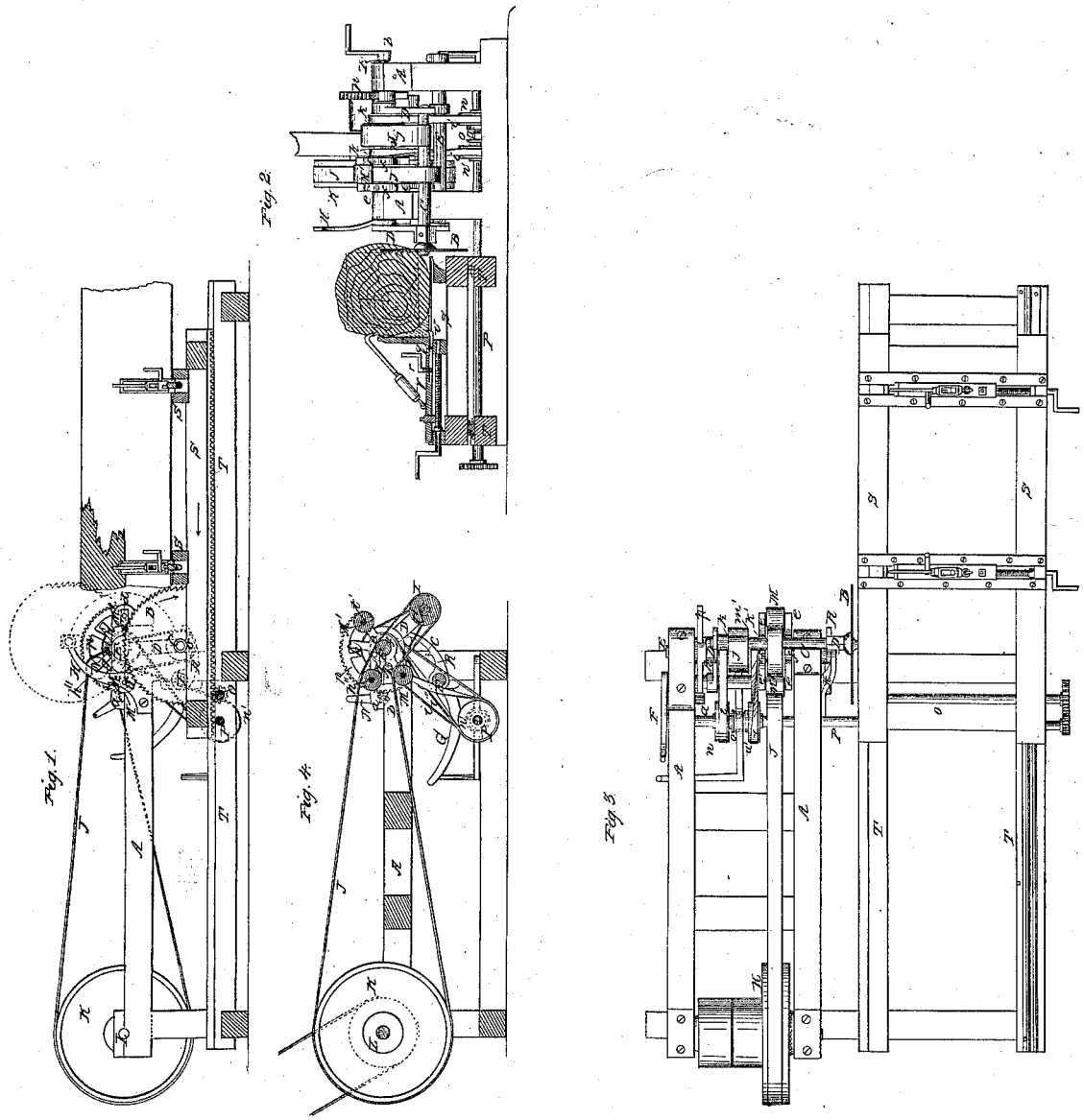

UNITED STATES PATENT OFFICE.

STEPHEN WATERMAN, OF WILLIAMSBURG, NEW YORK.

CIRCULAR SAWING MACHINE.

Specification of Letters Patent No. 10,778, dated April 18, 1854.

*To all whom it may concern:*

Be it known that I, STEPHEN WATERMAN, of Williamsburg, in the county of Kings and State of New York, have invented certain new and useful Improvements in Circular-Saw Mills; and I do hereby declare that the following is a full, clear, and exact description of the same, reference being had to the accompanying drawing, forming part of this specification, in which—

Figure 1, exhibits a side elevation of a saw mill constructed according to my improvements, with a longitudinal section of the log carriage and the bed on which it travels. Fig. 2, exhibits a front elevation of the same, with a transverse section of the log carriage and its bed. Fig. 3, is a plan of the mill. Fig. 4, exhibits a vertical section of a swinging frame in which the saw is hung, and of the stationary frame in which the said swinging frame works, exhibiting also the driving gear.

Similar letters of reference indicate corresponding parts in the several figures.

The first improvement consists in certain means by which the driving belt which drives the saw is always tightened when the saw is brought to a position for cutting either above or below the log, but is slackened to relieve it from strain either during the time the position of the saw is being changed or when the saw is not desired to operate.

The second improvement consists in providing proper means of elevating the saw shaft above the top of the carriage, and securing it in that position during the cutting off the slabs from the log, so that the nut and collar or other device for securing the saw to the shaft may work close under the unsquared part of the log, and thus be made to square a larger log than it could do, if the shaft were stationary below the bottom of the log in the position it occupies in cutting up the log, after it is squared.

The third improvement consists in furnishing the under sides of the slides by which the log is fed laterally across the carriage, as the planks or boards are successively cut off, with dogs which are pivoted to the slides, near the center of their length, and furnished with teeth at one end, which protrude beyond the faces of the said slide and under the log, into which they are forced by screws working through the slide and pressing on the opposite end. These dogs being used in conjunction with those commonly used, hold the log with great firmness and security.

To enable those skilled in the art to make and use my invention I will proceed to describe its construction and operation.

A, represents the main framing which supports the saw and all the mechanism which transmits motion thereto, and controls the operation thereof. The saw B is secured to its shaft C, in the usual manner. The shaft C, works in bearings in two arms D, D, which are secured to a rock shaft, E, which rests in bearings on the top of the main framing A, and at the front end thereof. The saw shaft and rock shaft are parallel, and the former is capable of moving round the latter in an arm, from the position shown in black in Figs. 1, to that shown in black in Figs. 1, to that shown in red in the same figure, carrying the saw from the proper position to cut into the log from its under side, to the position to cut from its upper side. The two shafts being parallel the saw always remains in the same plane. The saw is moved from one of these positions to the other by means of a pinion, *a*, on a small shaft, *b*, behind the rockshaft, which gears with a toothed section, *p*, on the rock shaft; the shaft, *b*, being furnished with a suitable crank handle to turn it. When the saw is in position for cutting under the log, the ends of the arms D, D, rest, for the purpose of holding the saw firm to resist the movement of the log, against projections or steps *c*, *c*, on toes R, R, which are secured to a shaft, F, which rests in bearings in the lower part of the framing A. This shaft, F, is furnished with a lever G, by which the position of the toes R, R, may be changed. Fig. 4, exhibits best the shape of the toes, but Fig. 1, shows in dotted lines their position when they hold the saw in the position just described. When the saw is in position for cutting above the log, one of the arms, D, rests against a stop piece H, secured on the top of the framing A. This is shown by red lines in Fig. 1. The saw is driven by a belt J, running over a pulley, I, on its shaft from a driving pulley K, on a shaft, L, which receives motion from any prime mover.

The contrivance for tightening the belt in the two cutting positions of the saw, and slackening it in changing position consists of three guide rollers of which two M, M′, are hung diametrically opposite each other on two arbors $d$, $d'$, secured to two pairs of arms $e$, $e$, $e'$, $e'$, which are cast with, or firmly attached to bosses $f$, $f$, secured to the rockshaft, E. These arms $e$, $e$, $e'$, $e'$, stand at right angles to the arms D, D, which carry the saw shaft. On the opposite side of the rockshaft to the saw shaft, an arm $g$, is attached to each boss $f$, in such a manner as to swing freely, and the two arms $g$, $g$, carry the arbor $h''$, which forms the axis of the third guide roller, N. Between the arm. $g$, and the arms, $e$, $e$, on each boss $f$, are two fixed arms, $h$, $h'$, which serve as rests for the arm, $g$, and against one pair of the arms, $h$, $h$, or $h'$, $h'$, the swinging arms, $g$, $g$, always rest. When the saw is cutting under the log, the relative positions of the guide rollers M, M', N, are such as to cause the lower part of the belt to pass over the roller, M, and the upper part to pass over the roller, N, whose arms, $g$, $g$, are then supported by the arms $h$, $h$, as shown in Figs. 1, and 2; but when the position of the saw is changed the upper part of the belt will pass under the roller, M, and the lower part under the roller, N, whose arms, $g$, $g$, will be then thrown upward against the arms, $h'$, $h'$, which stop them in the proper position. In moving the saw from one position to the other the belt is slackened; and it is relieved of a great tension at all times when the saw is not in operation, as then the arms, D, D, swing free.

The log carriage, S, and its bed T, are of ordinary construction, the carriage being moved upon the bed by a rack, on its under side and a pinion on a shaft, O, which receives motion by a pair of cog wheels from another shaft, P, which is furnished with two loose pulleys, $n$, $u'$, driven by two belts, $i$, $i$, from two pulleys, $k$, $k'$, which run loosely on the rock-shaft and receive motion through a belt, $j$, running from the saw shaft to a pulley, $m$, secured to the pulleys, $k$, $k'$. The belt, $i$, is straight but, $i$, is crossed, so that the pulleys, $n$, $u'$, may run in opposite directions, and a coupling, $o$, is provided to couple either with the shaft P, and drive the carriage in either direction. In cutting below the log the pulley, $n$, is coupled, to make the carriage run in the direction of the arrow shown on it in Fig. 1, but in cutting above, the pulley, $u'$, is coupled to drive the carriage in the opposite direction. In cutting plank or otherwise dividing the log the cut may be commenced either above or below. For the sake of illustrating the operation, I will suppose it to commence at the bottom. The carriage is run out to that end of the bed at the right hand of Fig. 1, and the log being properly adjusted, is started in the direction of the arrow shown in it. When its whole length has been run over the saw, the latter is raised by turning the pinion, $a$, and the motion of the carriage is then changed by moving the coupling, $o$, from the pulley, $n$, to the pulley, $u'$. The return of the carriage carries the log under the saw, and causes it to make a cut meeting the cut previously made, and thus complete the division of the log. In this way, with a proper lateral movement of the log, after every return of the carriage the cuts may be repeated till the log is divided into the number of planks or boards desired. The saw worked in this way will saw through a log whose thickness is equal to the whole diameter of the saw, minus the diameter of the shaft or the collar or other device, by which it is held thereon.

The movement of the saw shaft, which enables the saw to cut close under the unsquared portion of the log in taking off the slabs, enables the slabs to be cut from a log as large as could be cut up into planks if it were previously squared before introduction to the saw mill. This cannot be done with a fixed saw, or with the movable saw described without some means of securing it, as the following description will show. The log shown in Fig. 2, is the largest size that can, when squared to the lines shown upon it, be cut up by two cuts of the saw shown in that figure: But if the saw, when cutting under the log, were confined to the position in which it must be to cut up the squared log, that is to say, with its collar and nut below the plane of the top of the carriage it could not take the slab off so large a log, for the reason that the edge could not reach up to the center, but when the saw shaft is raised to the position shown, which is close under the unsquared part of the log and above the plane of the top of the carriage it will reach the center, and a similar cut being made from above also, will take off the slab. The movement of the saw shaft for raising the saw to the position for cutting under the log above the carriage is given, when the saw shaft is hung in swinging arms as shown, by means of the pinion, $a$, and sector, $p$, and the shaft is held in the required position by bringing the ends of the toes, R, R, against the arms, D, D, as shown in Fig. 4. This method of supporting will allow the elevation of the saw to be slightly varied and will afford ample security as the movement of the log while it is being cut will tend to force the arms against the points of the toes when they are thus raised.

The improved dog for holding the log at the bottom as shown in Fig. 2, consisting of a short lever, V, of the first order having its fulcrum on a pivot, $q$, which attaches it to the under side of the slide, V. One end projects out beyond the front face of the slide and is made with a tooth, $s$, of suitable form to enter the log. On the opposite side of the fulcrum, a screw, $r$, is fitted in a female screw through the slide V, in such a position as to bear upon the lever, when screwed down by a suitable handle above the slide and to force down that end of the lever, and thus force the tooth or point of the dog into the log. The end of the dog which carries the tooth is intended to be of sufficient weight to fall when the screw is raised, or the screw to be attached in such a way as to raise the other end and thus bring the dog out of the way, when not in actual use. This dog will not come into use upon unsquared, but only on squared legs, of which a corner of one is shown in red in Fig. 2, to illustrate the operation of the dog.

The advantage possessed by the within described method of employing a small saw to saw large lumber, will be appreciated when the first cost of large saws is considered, and the waste of stuff and loss of power caused by the great thickness of which it is necessary to make them. Its advantage over using two small saws, as sometimes practised, is also great, only half the power being required to drive it, while its operation is but little slower, owing to the cut being made against the grain during the movement of the carriage both back and forth, which is not done when the two saws are used.

The raising of the saw above the bed for taking off the slabs is also applicable when the log is just small enough to be cut by one cut, and its advantage is as great in that case, as when the log is larger and requires two cuts.

I do not claim hanging the shaft of a circular saw in a swinging frame moving around a stationary axis. But

What I claim as my invention and desire to secure by Letters Patent, is:—

1. Dividing the log by means of a single circular saw, whose shaft is hung in bearings, in arms, D, D, which constitute a swinging frame, moving round a stationary axis, when such swinging frame is so arranged and operated, as herein described, that the saw is made to cut half through the log from one side; and afterward, half through it from the other side, and thus effect the division without the aid of a saw upon the stationary axis, as heretofore employed in combination with such swinging saw.

2. Raising the saw shaft by any mechanical means analogous to those described to bring the collar and nut or other device by which the saw is secured thereto, to a fixed position above the level of the plane of the top of the carriage and close under the unsquared portion of the log during the cutting of the slabs from the log, so that the slabs may be cut from a much larger log than when the saw shaft, or the collar and nut, or other device for securing the saw thereto, remains below the level of the plane of the top of the carriage.

3. Controlling the tension of the driving belt, J, so that it shall be tight when the saw shaft is in position for cutting either above or below the log, but slack at other times, by means of the three guide rollers, M, M', N, of which the first two are hung on axes $d$, $d'$, in arms, $e$, $e$, $e'$, $e'$, secured firmly to the rock shaft, and the latter is hung on an axis, $h''$, in swinging arms, $g$, $g$, which are held in proper position when the belt is tight, by contact with fixed arms, $h$, $h'$, on the shaft, the whole operating as herein set forth.

4. A dog, U, of the lever form described, attached below each or any of the slides, V, by which the log is moved laterally, so that its tooth will project beyond the face of the said slide, and under the log, and controlled by a screw through the slide by which its tooth may be forced upward into the log when desired, as herein described.

STEPHEN WATERMAN.

Witnesses:
S. H. WALES,
L. F. COHEN.